United States Patent
Shashanka et al.

(10) Patent No.: US 12,457,234 B1
(45) Date of Patent: Oct. 28, 2025

(54) METHODS AND SYSTEMS FOR DETERMINING ANOMALOUS USER ACCESS TO DATA OBJECTS

(71) Applicant: Concentric Software, Inc., San Mateo, CA (US)

(72) Inventors: Madhusudana Shashanka, Austin, TX (US); Sumeet Khirwal, Jamshedpur (IN)

(73) Assignee: CONCENTRIC SOFTWARE, INC., Saratoga, CA (US)

(*) Notice: Subject to any disclaimer, the term of this patent is extended or adjusted under 35 U.S.C. 154(b) by 0 days.

(21) Appl. No.: 19/031,245

(22) Filed: Jan. 17, 2025

(51) Int. Cl.
 *H04L 9/40* (2022.01)
(52) U.S. Cl.
 CPC .................. *H04L 63/1425* (2013.01)
(58) Field of Classification Search
 CPC . H04L 63/1416; H04L 63/1425; H04L 63/20; H04L 63/1408; H04W 12/122
 See application file for complete search history.

(56) References Cited

U.S. PATENT DOCUMENTS

| | | | | |
|---|---|---|---|---|
| 9,298,914 | B1* | 3/2016 | McCorkendale | G06F 21/552 |
| 10,075,461 | B2* | 9/2018 | Mumcuoglu | H04L 63/1441 |
| 11,575,680 | B1* | 2/2023 | Challey | G06N 20/00 |
| 2020/0349270 | A1* | 11/2020 | Tzur | G06N 20/00 |
| 2021/0075707 | A1* | 3/2021 | Kumar | H04L 43/067 |
| 2021/0076212 | A1* | 3/2021 | Manikantan Shila | H04W 12/065 |
| 2021/0194906 | A1* | 6/2021 | Chen | H04L 9/0866 |
| 2023/0129466 | A1* | 4/2023 | Moore | G06F 11/3438 726/17 |
| 2023/0262072 | A1* | 8/2023 | Cambric | G06N 3/08 726/22 |
| 2023/0319047 | A1* | 10/2023 | Wu | H04L 67/06 726/26 |

OTHER PUBLICATIONS

Ren et al., "Data Representation Based on Interval-Sets for Anomaly Detection in Time Series," IEEE Access Year: 2018 | vol. 6 | Journal Article | Publisher: IEEE.*
Liu et al., "LMGD: Log-Metric Combined Microservice Anomaly Detection Through Graph-Based Deep Learning," IEEE Access Year: 2024 | vol. 12 | Journal Article | Publisher: IEEE.*

* cited by examiner

*Primary Examiner* — Roderick Tolentino
(74) *Attorney, Agent, or Firm* — Evergreen Valley Law Group; Kanika Radhakrishnan

(57) ABSTRACT

Methods and systems for determining anomalous user access to data objects. The method includes determining baseline access data comprising a plurality of access elements. The method includes generating target access data for the user, where the target access data indicates a count of data objects accessed by the user within each of the plurality of semantic categories during a target time interval. The method includes computing an anomalous factor for the user based, at least in part, on the baseline access data and the target access data. The anomalous factor for the user indicates a degree of the anomalous behavior of the user during the target time interval. The method includes determining whether the user is an anomalous user based, at least in part, on the computed anomalous factor for the user.

18 Claims, 7 Drawing Sheets

METHODS AND SYSTEMS FOR DETERMINING ANOMALOUS USER ACCESS TO DATA OBJECTS

TECHNICAL FIELD

The present invention relates to enterprise security management, and more particularly, to methods and systems for determining anomalous user access to data objects in large enterprises.

BACKGROUND

Enterprises typically rely on security groups to manage and control access to sensitive documents, files, and other resources. These security groups often correspond to specific departments, roles, or functions within the enterprise. These groups are then assigned permissions to access certain sets of documents or resources, ensuring that all the group members have the necessary access to perform their roles. This method simplifies access control by allowing administrators to manage permissions at the group level, rather than for each individual user.

However, as enterprises grow, the number of security groups can proliferate, increasing the complexity of managing access rights and ensuring the proper protection of sensitive information. The proliferation of redundant groups increases the threat surface. The ever-increasing volume of documents generated within enterprises presents a significant challenge for security teams. In medium to large enterprises, it is not uncommon to find tens of thousands of security groups, each with varying degrees of access to resources. One of the primary challenges in managing security groups is the potential impact on business continuity when changes are made. Removing users from security groups or eliminating groups can disrupt access to critical resources, hindering employees from performing their job functions. This risk makes enterprises cautious about modifying or streamlining group configurations, even when outdated or redundant groups are identified.

The accumulation of security groups, many of which may be obsolete or grant excessive or unnecessary permissions, introduces significant security risks for enterprises. Permissions are frequently granted in an ad hoc manner, with little consideration for ongoing validation or periodic review. As users gain access to resources beyond what is required for their roles, the enterprise becomes more vulnerable to security threats. It provides malicious entities with more opportunities to exploit excessive or unmonitored permissions, potentially leading to unauthorized access, data breaches, and other security incidents.

While best practices like enforcing least privilege access and conducting regular permission reviews aim to mitigate these risks, they cannot fully address insider threats. These threats may originate from malicious insiders or external adversaries who acquire legitimate user credentials to impersonate an insider. Malicious actors leveraging legitimate permissions can access sensitive information and compromise an enterprise's security.

In response to such challenges, User and Entity Behavior Analytics (UEBA) has emerged as a cybersecurity approach to detect potential insider risks. UEBA systems monitor user activities and look for anomalies in behavior, to identify patterns that may indicate malicious activity. This method tracks the behavior of all users, including non-human entities like applications and service accounts, to uncover deviations from expected norms.

However, the effectiveness of UEBA systems is limited in practice due to the high volume of false-positive alerts. Many detected anomalies are benign and unrelated to malicious activity. For instance, an employee downloading an unusually large number of documents may trigger an anomaly alert. Yet, such behavior may align with legitimate job responsibilities and not indicate any malicious intent.

The primary limitation of UEBA lies in its lack of contextual understanding of the semantic nature of the data or activities involved. Without this context, UEBA systems generate alerts that fail to distinguish between legitimate and suspicious actions. These false positives place a significant burden on cybersecurity teams, diverting resources from addressing actual threats and potentially leading to alert fatigue.

Hence, there exists a technological need for more effective mechanisms to determine anomalous user access to data objects within large enterprises and to take appropriate actions to mitigate the risk exposure of the enterprise. This approach aims to address this gap by providing methodologies to identify users who exhibit anomalous behavior.

SUMMARY

Various embodiments of the present disclosure provide methods and systems for determining anomalous user access to data objects in large enterprises.

In an embodiment, a computer-implemented method is disclosed. The computer-implemented method performed by a server system includes determining baseline access data including a plurality of access elements. Each access element corresponds to a respective historical time interval from a plurality of historical time intervals. Each access element indicates a count of data objects accessed by the user within each of a plurality of semantic categories during a respective historical time interval. The method includes generating target access data for the user. The target access data indicates a count of data objects accessed by the user within each of the plurality of semantic categories during a target time interval. The method includes computing an anomalous factor for the user based, at least in part, on the baseline access data and the target access data. The anomalous factor for the user indicates a degree of the anomalous behavior of the user during the target time interval. The method includes determining whether the user is an anomalous user based, at least in part, on the computed anomalous factor for the user.

In another embodiment, a server system is disclosed. The server system includes a memory configured to store instructions, a communication interface, and a processor configured to execute the instructions stored in the memory and thereby causing the server system to determine baseline access data including a plurality of access elements. Each access element corresponds to a respective historical time interval from a plurality of historical time intervals. Each access element indicates a count of data objects accessed by the user within each of a plurality of semantic categories during a respective historical time interval. The server system is also caused to generate target access data for the user. The target access data indicates a count of data objects accessed by the user within each of the plurality of semantic categories during a target time interval. The server system is also caused to compute an anomalous factor for the user based, at least in part, on the baseline access data and the target access data. The anomalous factor for the user indicates a degree of the anomalous behavior of the user during the target time interval. The server system is also caused to determine whether the user is an anomalous user based, at least in part, on the computed anomalous factor for the user.

In another embodiment, a computer-implemented method is disclosed. The computer-implemented method performed by a server system includes determining baseline access data including a plurality of access elements. Each access element corresponds to a respective peer user from a plurality of peer users. Each access element indicates a count of data objects accessed by the respective peer user within each of a plurality of semantic categories. The method includes generating target access data for the user. The target access data indicates a count of data objects accessed by the user within each of the plurality of semantic categories during a target time interval. The method includes computing an anomalous factor for the user based, at least in part, on the baseline access data and the target access data. The anomalous factor for the user indicates a degree of the anomalous behavior of the user during the target time interval. The method includes determining whether the user is an anomalous user based, at least in part, on the computed anomalous factor for the user.

In another embodiment, a server system is disclosed. The server system includes a memory configured to store instructions, a communication interface, and a processor configured to execute the instructions stored in the memory and thereby causing the server system to determine baseline access data including a plurality of access elements. Each access element corresponds to a respective peer user from a plurality of peer users. Each access element indicates a count of data objects accessed by the respective peer user within each of a plurality of semantic categories. The server system is also caused to generate target access data for the user. The target access data indicates a count of data objects accessed by the user within each of the plurality of semantic categories during a target time interval. The server system is also caused to compute an anomalous factor for the user based, at least in part, on the baseline access data and the target access data. The anomalous factor for the user indicates a degree of the anomalous behavior of the user during the target time interval. The server system is also caused to determine whether the user is an anomalous user based, at least in part, on the computed anomalous factor for the user.

BRIEF DESCRIPTION OF THE FIGURES

For a more complete understanding of example embodiments of the present technology, reference is now made to the following descriptions taken in connection with the accompanying drawings in which.

Figure 1:
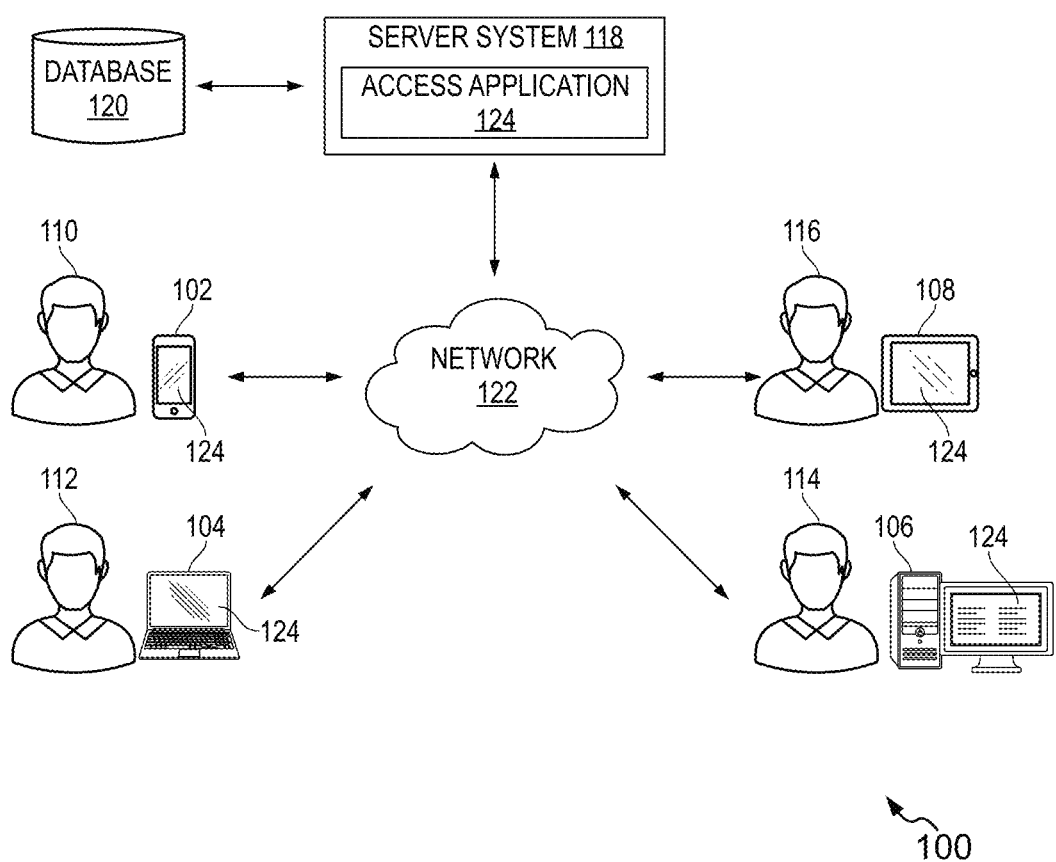
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "data object", "document", "file", and "electronic document" may have been used interchangeably throughout the description. Unless the context suggests otherwise, these terms refer to a digital file that contains information formatted for electronic storage, retrieval, and display on various output devices such as computer, etc.

Unless the context suggests otherwise, the term "anomalous users" refers to users within a system who have been granted access permissions that exceed what is necessary for their roles. These users may have access to more data objects, systems, or functionalities than required, posing a security risk due to unnecessary exposure to sensitive information or critical systems.

Unless the context suggests otherwise, the term "baseline" refers to a standard or reference point used to assess and compare user activity within an enterprise system. It represents either historical behavior of the user or typical behavior of peer users.

Unless the context suggests otherwise, the term "target time interval" refers to a specific, predefined period during which user activity is analyzed to evaluate behavior for the detection of anomalies within an enterprise.

Overview

Various example embodiments of the present disclosure provide methods and systems for determining anomalous user access to data objects in large enterprises. The core invention involves identifying users whose behavior deviates significantly from established patterns, whether based on their historical actions or the behavior of their peers. These systems monitor the way users access data objects and compare their activity to a defined baseline. The baseline serves as a reference point for evaluating whether a user's access pattern is abnormal.

There are two main approaches for defining the baseline for comparison. The historical baseline compares a user's current behavior to their past actions, considering patterns over a defined period. The peer baseline, on the other hand, evaluates a user's behavior in relation to the behavior of peer users in similar roles or contexts. By applying statistical analysis to both historical and peer access data, the system can identify users whose current actions fall outside the expected range, flagging them for further review.

The proposed system analyzes various access categories, such as the types of documents being accessed and the frequency of access, to determine whether the behavior is anomalous. This approach helps enterprises detect potential risks, such as unauthorized access or data breaches, by pinpointing unusual access patterns and reducing the likelihood of security threats.

Upon identification of the anomalous users, the system can execute appropriate actions to reduce the risk of unauthorized access within the organization. For example, the system may analyze the existing grouping structure and composition of security groups and their associated permissions within an enterprise, identifying redundant, obsolete, or overly access permission and generating a new set of groups i.e. optimizing the existing groups for efficient access control.

Various embodiments of the present disclosure offer multiple advantages and technical effects. For instance, the proposed invention offers several significant advantages, particularly in the context of risk management and access control of files within an enterprise. One of the primary benefits is the ability to identify the users associated with anomalous behavior. By identifying anomalous users, enterprises are better equipped to take corrective actions and limit exposure to potential security breaches.

Traditional mechanisms often detect anomalies that are benign and unrelated to malicious activity. The proposed invention addresses this issue by enabling enterprises to actively monitor and evaluate user activity based on the baseline data. By identifying anomalous behaviors, organizations can assess and mitigate potential risks. This proactive approach strengthens the overall security and integrity of enterprise systems.

Various embodiments of the methods and systems for identifying anomalous behavior of users are described hereinafter with reference to FIG. 1 to FIG. 7.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, the way in which a server system 118 (interchangeably referred to as "system 118") facilitates determining anomalous user access to data objects for enhanced and secured access control within the enterprise. The example representation of the environment 100 generally includes a plurality of user devices 102, 104, 106, and 108 associated with a plurality of users 110, 112, 114, and 116, respectively, a server system 118, and a database 120 connected to, and in communication with (and/or with access to) a wireless communication network (e.g., a network 122). The plurality of users are associated with an enterprise.

In the illustrated environment 100, the plurality of user devices 102-108 are depicted as a mobile phone, a laptop, a desktop computer, and a tablet respectively. However, the plurality of user devices 102-108 may include any other suitable electronic or computing device as well. For instance, the computing device may be, for example, a smartphone, a personal computer, an electronic tablet, a wearable device, a smart device such as a smart TV or smart appliance, etc.

In one example, the plurality of users 110-116 may access a set of data objects such as documents or files through the associated user devices 102-108. The server system 118 allows the plurality of users 110-116 to input user credentials for authorizing the user to access the set of data objects. The server system 118 may act as a central authority responsible for managing access to these resources. In this case, two-step authorization can be performed. In the first step, each user must provide their credentials (such as usernames, passwords, or other authentication methods). The server system 118 checks these credentials to authenticate the user's identity. Once the users 110-116 are authorized, the server system 118 moves on to a second step to determine the access permissions granted to the users 110-116. These permissions define what each user can do within the system, such as viewing, editing, or downloading specific documents or files. The system 118 assesses the user's profile, group membership, or other authorization parameters to decide whether the user is permitted to access the requested data objects. This process ensures that the authenticated users are allowed to perform the correct actions based on predefined rules set by administrators.

Based on the access permissions, if the user's access permissions meet the required level for the documents or data they are trying to access, the system 118 grants access, allowing the user to proceed with viewing or interacting with the files. However, if the permissions are insufficient—for instance, if the user is not part of a security group that has access to the requested files, the system 118 denies the request. This denial ensures that unauthorized users cannot reach restricted or sensitive data, reinforcing the organization's security policies.

In another embodiment, the server system 118 responsible for identifying users with anomalous behavior can work in tandem with an access control server (not shown) that manages and controls actual access to data objects, such as documents or files. In this case, the server system 118 focuses on analyzing the information associated with users and identifying any anomalies or users with anomalous behavior that exceed their required threshold. The server system 118 identifies users whose access behavior is disproportionate to reference behavior as defined by the baseline data. Once these users are flagged, appropriate actions can be taken to mitigate the associated risks. Such actions may include triggering an customization action including blocking the access of the data objects to the anomalous user, the removal of unnecessary permissions, adjustment of existing permissions to align more closely with the users' current roles, or further refining permission structures to maintain an optimal balance between accessibility and security. The server system 118 does not directly grant or deny access but serves as a critical decision-making layer that analyzes and flags potential risks, feeding this information back to the access control server. The access control server is responsible for enforcing the recommended changes, which may involve modifying access rights, removing users from certain permission groups, or making other adjustments as needed to ensure secure and manageable access to enterprise data. By allowing the server system 118 to specialize in risk analysis and user behavior identification while delegating enforcement tasks to the access control server, enterprises can achieve greater control over their access structures.

In this manner, the server system 118 operates seamlessly alongside the access control server to ensure that users' permissions are appropriately managed without causing disruptions to their workflow. The users 110-116 can continue accessing the documents and resources they need for their tasks, while the server system 118 operates efficiently in the background, minimizing risk. This dual focus enhances both security and operational continuity across the enterprise. This entire process occurs seamlessly and in real-time, ensuring that the users 110-116 can access necessary resources immediately if authorized, while also preventing unauthorized access. By managing access based on each user's credentials and permissions, the server system 118 ensures both security and efficiency in the handling of sensitive documents, safeguarding the organization's data integrity and compliance with security protocols. However, it will be apparent to a person skilled in the art that all the functionalities described herein for the access control server can be embedded within the server system 118.

It should be noted that the number of users and user devices described herein are only used for exemplary purposes and do not limit the scope of the invention. The main objective of the invention is to identify anomalous users whose access patterns deviate from baseline access patterns within large enterprises.

The server system 118 may be deployed as a standal one server or can be implemented in the cloud as software as a service (Saas). The server system 118 provides or hosts an access application 124 for enabling the plurality of users 110, 112, 114, and 116 to provide access to the set of data objects within large data object collections. For example, the access application 124 may be a mobile application, a desktop application, a website, or a plugin in a third-party application. For example, the third-party application may be any existing access application facilitating the execution of tasks similar to that performed by the server system 118. In some embodiments, the access application 124 can be implemented as operating system extensions, modules, plugins, and the like. Further, the access application 124 may be operative in a cloud infrastructure, or the access application 124 may be executed within or as a virtual machine (VM) or virtual server that may be managed in the cloud infrastructure.

The server system 118 is embodied in at least one computing device in communication with the network 122 and/or embodied in at least one non-transitory computer-readable media. For example, an instance of the access application 124 is accessible to the user devices 102-108, as shown in the environment 100 in FIG. 1. This enables the plurality of users 110-116 to be able to access the server system 118 on the user devices 102-108. The access application 124 is a set of computer-executable codes configured to provide user interfaces (UIs) enabling the plurality of users 110-116 to get access to a set of data objects under the two-step authorization for the request to access the data objects. In an embodiment, the server system 118 may provide access to the data objects through the access application 124, in response to a request received from the user devices 102-108 via the network 122. In another embodiment, the access application 124 may be factory-installed on the user devices 102-108.

The network 122 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 122 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include multiple different networks, such as a private network made accessible by the user devices 102-108, the server system 118, and the database 120 separately, and/or a public network (e.g., the Internet) through which the user devices 102-108, the server system 118, and the database 120 may communicate.

In one embodiment, the server system 118 is configured to perform one or more of the operations described herein. In particular, the server system 118 is configured to retrieve historical access information for the user (e.g., user 110) from e.g. database 120. The historical access information may include information about the user's interactions with a variety of data objects over a defined prior period.

The historical access information includes data regarding data objects accessed by the user during a past period. The historical access information specifies a set of data objects that have been accessed by the user along with the corresponding time stamp. This timestamp indicates when the user accessed each data object, enabling precise tracking of user activity over time. By associating each data object with its corresponding access time, this information allows for the identification of usage patterns, such as frequency of access, peak activity periods, and the number of accessed data objects for a particular time interval. The historical access information may be stored for each of the plurality of users 110-114. This information helps determine which users or groups have accessed to specific data objects such as files, databases, applications, or specific documents within a company's network. This data plays a critical role in determining the access behavior of user 110 in the past and helps the system to monitor the usage of sensitive or critical resources.

Additionally, the historical access information captures details about the type of access the user 110 performed on the data objects. This includes actions such as viewing, editing, or managing the data objects, as well as metadata about how and when the user 110 accessed them. Access logs provide a granular level of detail, allowing enterprises to track user activity over time. This information is crucial for identifying patterns of behavior, which can help detect anomalies that may indicate unauthorized access, policy violations, or other forms of suspicious activity. By analyzing these patterns, the system 118 can enhance their ability to mitigate security risks within the enterprise.

The plurality of data objects may be associated with a plurality of categories allowing for flexible and granular organization of information. Each category exhibits unique characteristics compared to other categories. Each data object can belong to one or more categories, which can represent various groupings or clusters. The categorization or grouping of objects can be performed based on their semantic meaning. These categories serve to facilitate efficient access and management of the data objects by enabling users to navigate based on thematic or contextual relationships. The system can assign data objects to categories dynamically, ensuring that the organizational structure remains adaptable to evolving user needs and permissions.

In another embodiment, the data object can be categorized based on arbitrary granularity. In this case, data objects are categorized at various levels of detail without being constrained to fixed or predefined categories. This categorization enables the system 118 to assign data objects to categories based on varying degrees of specificity or context. The system 118 can dynamically adjust the granularity depending on the nature of the data and user needs. The categorization allows the system 118 to create categories and clusters that reflect the evolving relationships between data objects, enabling users to retrieve and organize information in a way that best suits their requirements at any given time.

Thus, the historical access information may include the data objects accessed by each user during a prior period and the information about categories associated with each data object.

Based on the historical access information, the server system 118 is configured to determine baseline access data for the user 110. The baseline access data includes a plurality of access elements corresponding to a plurality of historical time intervals. Each access element indicates a count of data objects accessed by the user within each of a plurality of semantic categories during a respective historical time interval. In an embodiment, the historical time intervals are consecutive time intervals and the duration of each time interval is same. The plurality of historical intervals can be obtained by partitioning the past period for which the historical access information is received, into a predefined number of segments.

In some embodiment, the server system 118 is configured to retrieve peer access information for the plurality of peer users 112-116. The peer access information may include a set of data objects accessed by each of the peer users 112-116 and associated types of access for a particular time interval. For instance, the peer access data may include the set of data objects accessed by each of the plurality of peer users 112-116 for a particular time period. The peer access information may also include information about one or more semantic categories associated with each data object.

The peer access data can include a list of users within the enterprise. This list can include basic information such as user IDs, names, job roles, departments, and possibly their locations. Example: John Doe (user ID 1234), Jane Smith (user ID 5678). Each user is associated with one or more security groups (interchangeably referred to as "groups") and the group can be associated with other groups. The server system 118 collects information on all existing groups within the enterprise, including group names, descriptions, and the users that belong to each group.

The server system 118 is configured to determine baseline access data for the user 110 based on the peer access information. The baseline access data can include a plurality of access elements, where each access element corresponds to a respective peer user from a plurality of peer users 112-116. Each of the plurality of access elements indicates a count of data objects accessed by the respective peer user within each of the plurality of semantic categories.

In an embodiment, the server system 118 may also be configured to obtain target access information for the user, based on which anomalous behavior of the user is determined. This information represents the user's access activity during a specific time interval under evaluation, referred to as the target time interval. The target access information provides a snapshot of the user's behavior, including details such as the semantic category of data objects accessed, the frequency of access, and the timing of these activities. This real-time or recent data is critical for comparing the user's current behavior against established patterns.

The target access information can include a comprehensive list of data objects including all files and folders within the enterprise accessed by the user 110. For each file or folder, the corresponding access information is examined. This includes when the corresponding file/folder has been accessed and the type of access (read, write, delete, etc.). The access information may include data associated with a set of data objects accessed by the user for a target time interval. The target time interval is different from each of the plurality of historical time intervals. However, the duration of the target time interval may be the same or different fromthe duration of at least one of the historical time intervals.

In an embodiment, the peer access data are determined corresponding to the target time interval. In another embodiment, the peer access data are determined corresponding to a time interval different from the target time interval.

The server system 118 may be configured to segregate the access information according to the plurality of semantic categories. In an example, the server system may be configured to cluster the data objects into a plurality of clusters. Each cluster corresponds to a semantic category.

The server system 118 may be configured to count the number of data objects associated with each semantic category to generate target access data. The target access data indicates a count of data objects accessed by the user within each of the plurality of semantic categories during a target time interval.

The server system 118 may obtain the historical access information, peer access information, and target access information in structured format such as Extensible Markup Language (XML) or JavaScript Object Notation (JSON) format. In another embodiment, the historical access information, peer access information, and target access information can be obtained in Comma-separated values (CSV), Structured Query Language (SQL), or Excel format.

The historical access information, the peer access information, and the target access information can be obtained in various ways. For instance, the server system 118 can be configured to interact with other systems and databases through application programming interfaces (APIs). This integration allows the server system 118 to automatically fetch historical access information, peer access information, and target access information from external sources such as enterprise content management systems, cloud storage services, or document repositories. Most cloud-hosting providers offer API endpoints that provide detailed activity information. By subscribing to these APIs, the server system can retrieve data including user details, file information, timestamps, and event types (such as view, edit, download, print, etc.) for each activity event. This enables comprehensive tracking of user actions, offering insights into the types of interactions users are having with the data objects in the system.

In another example, the server system 118 can fetch the information directly from the database 120. In another example, the server system 118 can employ web crawling techniques to gather data from specific websites or intranets. In another example, the server system 118 can use stream processing to continuously ingest documents from real-time data streams. This approach is suitable for scenarios where documents are generated continuously and need to be processed on-the-fly.

The server system 118 may be configured to determine baseline access data and target access data based on historical access information (or peer access information) and the target access information, respectively. The server system 118 may then be configured to analyze the target access data in conjunction with the user's baseline access data, which includes either historical access data (the user's past behavior) or peer access data (the behavior of peer users in similar roles or groups). By comparing the target access information with these baselines, the server system 118 can detect deviations in behavior. For example, if a user typically accesses 5-10 documents per day but accesses 50 documents during the target time interval, it may indicate anomalous behavior.

The server system 118 employs statistical and computational methods to quantify these deviations, often calculating an anomalous factor. This factor represents the degree of deviation between the target access data and the baseline access data. If the anomalous factor exceeds a predefined threshold, the system 118 flags the user as potentially exhibiting anomalous behavior, warranting further investigation.

The anomaly detection is essential for maintaining the security and integrity of enterprise systems. By continuously analyzing the target access data and comparing it against historical or peer baselines, the system 118 can proactively identify and respond to potential risks, such as unauthorized access, insider threats, or compromised accounts. This capability ensures that anomalies in user behavior are promptly detected and addressed, reducing the likelihood of data breaches or misuse of resources.

The number and arrangement of systems, devices, and/or networks shown in FIG. 1 are presented as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the server system 118 should be understood to be embodied in at least one computing device in communication with the network 122, which may be specifically configured, via executable instructions, to perform steps as described herein, and/or embodied in at least one non-transitory computer-readable media.

Figure 2:
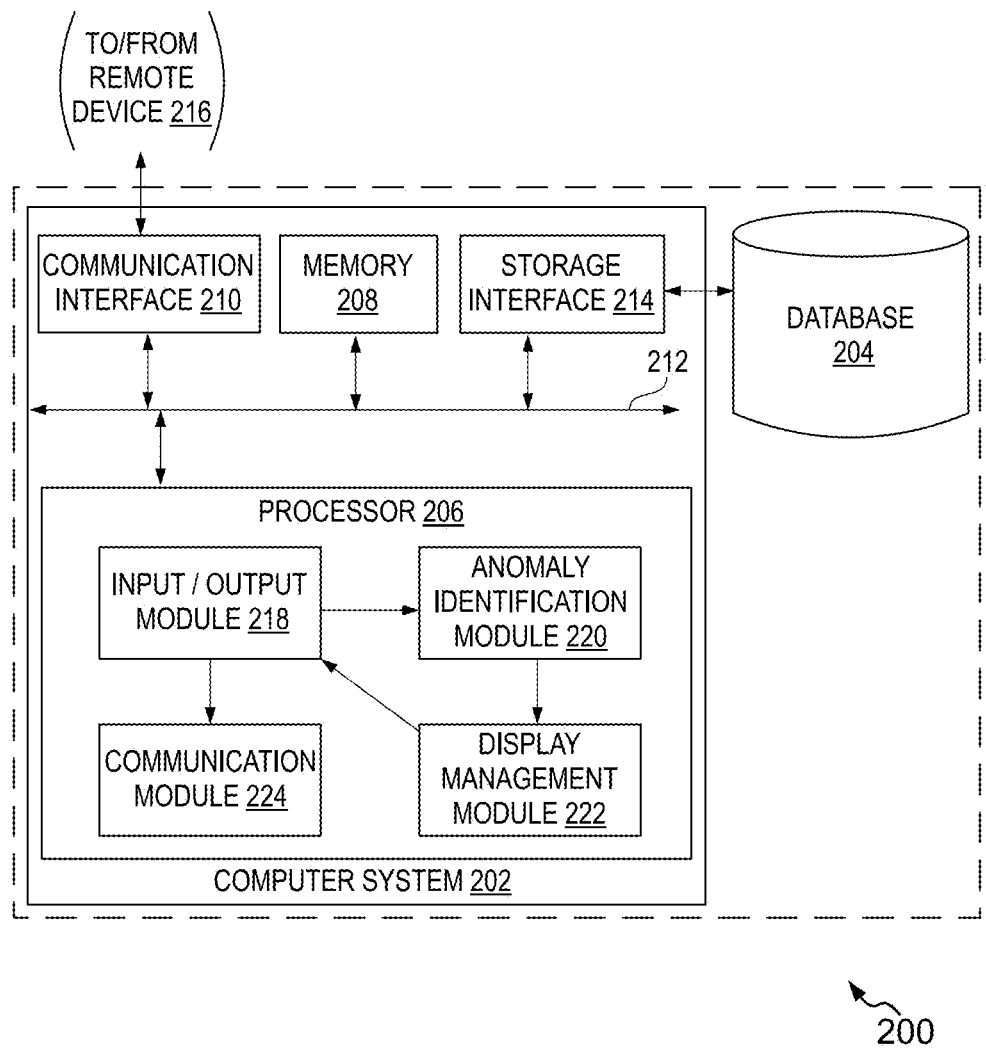
FIG. 2 is a simplified block diagram representation of a server system, in accordance with an embodiment of the present disclosure.

FIG. 2 is a simplified block diagram representation of a server system 200, in accordance with an embodiment of the present disclosure. The server system 200 is an example of the server system 118 depicted in FIG. 1. In some embodiments, the server system 200 is embodied as a cloud-based and/or SaaS-based (software as a service) architecture. The server system 200 is configured to facilitate determining an anomalous behavior of the user.

The server system 200 includes a computer system 202 and a database 204. The database 204 is an example of the database 120 of FIG. 1. The computer system 202 includes at least one processor 206 (hereinafter referred to as "processor") for executing instructions, a memory 208, a communication interface 210, and a storage interface 214 that communicate with each other via a bus 212.

In some embodiments, the database 204 is integrated into the computer system 202. For example, the computer system 202 may include one or more hard disk drives as the database 204. In one embodiment, the database 204 is integrated within the computer system 202 and configured to store an instance of the access application 124. Further, the storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions for performing one or more operations for identifying anomalous behavior of users within an enterprise. Examples of the processor 206 include but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include but are not limited to, a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the user devices 102-108, or with any entity connected to the network 122 (as shown in FIG. 1). In an embodiment, the processor 206 is configured to facilitate the access application 124 on the user devices 102-108 for enabling a plurality of functionalities to the devices described in the disclosure.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

Further, in an embodiment, the server system 200 includes an input/output (I/O) module 218, an anomaly identification module 220, a display management module 222, and a communication module 224. It should be noted that components, described herein, can be configured in a variety of ways, including electronic circuitries, digital arithmetic and logic blocks, and memory systems in combination with software, firmware, and embedded technologies. For example, the modules 218, 220, 222, and 224 can be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The I/O module 218 is configured to receive the historical access information associated with an enterprise. For instance, I/O module 218 receives the historical access information for a prior period. The historical access information may indicate information about a plurality of data objects accessed by the user during a prior period. The historical access information may include details about the semantic category, from a plurality of semantic categories, associated with each data object. Based on historical access information, the anomaly identification module 220 may determine baseline access data for the user. The baseline access data includes a plurality of access elements, where each access element corresponds to a respective historical time interval from a plurality of historical time intervals. Each access element indicates a count of data objects accessed by the user within each of a plurality of semantic categories during a respective historical time interval. This historical time interval can be predefined and the duration of each historical time interval can be the same.

In an alternative embodiment, the I/O module 218 is configured to receive the peer access information associated with an enterprise. For instance, I/O module 218 receives the peer access information for a prior period. The peer access information may indicate information about a plurality of data objects accessed by a plurality of peer users 112-116 during a prior period. The peer access information may include details about the semantic category, from a plurality of semantic categories, associated with each data object. Based on peer access information, the anomaly identification module 220 may determine baseline access data including all the accessed data objects by each of the plurality of peer users within each semantic category during a prior period. The baseline access data can include a plurality of access elements, where each access element corresponds to a respective peer user from a plurality of peer users. Each access element indicates a count of data objects accessed by the respective peer user within each of a plurality of semantic categories.

The I/O module 218 is configured to receive target access information for the target time interval. The target access information may include a comprehensive list of data objects including all files and folders within the enterprise. For each file or folder, the corresponding access information is examined. This includes when the corresponding file/folder has been accessed and the type of access (read, write, delete, etc.).

The target access information may include data associated with a set of data objects accessed by the user for a target time interval. The target time interval is different from each of the plurality of historical time intervals. In an embodiment, the peer access data are determined corresponding to the target time interval. In another embodiment, the peer access data are determined corresponding to a time interval different from the target time interval.

The server system 118 may be configured to segregate the target access information according to the plurality of semantic categories. The anomaly identification module 220 may be configured to count the number of data objects associated with each category to determine target access data. The target access data indicates a count of data objects accessed by the user within each of the plurality of semantic categories during a target time interval.

The baseline access data represents the user's normal behavior over a defined period, such as the past week, month, or even longer. This data includes information such as the types of data objects the user typically accesses, the frequency of access, the time of day, and other behavioral patterns. The target access data, on the other hand, refers to the user's behavior during a specific, targeted time interval (e.g., today, this week). The anomaly identification module 220 compares these two datasets to identify any significant discrepancies.

In an alternative embodiment, the baseline access data represents the typical behavior of similar users or peer users within the same group, role, or department over a defined period, such as the past week or month. This data includes patterns such as the types of data objects frequently accessed by the users in the same peer group, the typical frequency of access, the times of day, and other common behaviors observed across peers. In contrast, the target access data refers to the individual user's behavior during a specific, targeted time interval (e.g., today or this week). The anomaly identification module 220 compares the user's target access data to the baseline access data to detect any significant deviations, helping to identify when a user's activity diverges from that of their peers, which may indicate anomalous or suspicious behavior.

Therefore, upon determination of the baseline accessdata and the target access data, the anomaly identification module 220 may be configured to compute an anomalous factor for the user based, at least in part, on the baseline access data and the target access data. The anomalous factor for the user indicates a degree of the anomalous behavior of the user during the target time interval. This factor quantifies the extent to which the user's current behavior deviates from their established baseline, providing a clear indicator of potential anomalies.

The anomalous factor is a numerical value that reflects the degree of deviation between the baseline and the target data. If the user's behavior during the target time interval significantly deviates from their baseline, the anomalous factor will be high, indicating that the user is exhibiting unusual or potentially suspicious activity. Conversely, if the user's behavior remains consistent with their baseline, the anomalous factor will be low, suggesting that there are no significant changes in behavior.

In an embodiment, to compute the anomalous factor, the anomaly identification module 220 may be configured to generate a first representation of the baseline access data. In a specific embodiment, the anomaly identification module 220 may generate the first representation of the baseline access data as a first matrix (interchangeably referred to as "baseline matrix") based on the plurality of the access elements within the baseline access data. These access elements represent key data points related to the user's interaction with various data objects over time. For instance, each access element may include information such as the number of data objects accessed by the user, the types of data objects, or the frequency and time of access within a given time interval. The matrix structure allows the system to organize this data in a way that enables efficient comparison and analysis.

The way the matrix is structured depends on the type of data being analyzed (historical access data or peer access data). For example, if each row corresponds to a particular access element-such as the number of data objects accessed within each of the plurality of categories. The columns, on the other hand, could represent a plurality of semantic categories. Based on the type of baseline access data, the first matrix can be defined as follows:

When the baseline access data is historical access data: The rows represent different historical time intervals (e.g., days, weeks, or months) and the columns represent a plurality of semantic categories. In this case, the matrix captures how the user's access patterns have evolved over time. Each column represents a different semantic category, showing the count of data objects accessed by the user belonging to that category.

When the baseline access data is peer access data: The columns represent peer users—users within the same role, group, or department. In this scenario, the matrix compares the user's access patterns to those of their peers. Each column represents a different semantic category, showing the count of data objects accessed by the user belonging to that category.

Similarly, the roles of rows and columns can be switched. For instance, if columns represent access counts, then rows could represent semantic categories. The structure of the first matrix allows the anomaly identification module 220 to compare the user's behavior to either their historical access patterns or the behavior of their peers.

In an example, if the plurality of access elements are $A_1$, $A_2$, $A_3$, and $A_4$ corresponding to time intervals $T_1$, $T_2$, $T_3$, and $T_4$, respectively, and a plurality of semantic categories are $C_1$, $C_2$, and $C_3$, then the first matrix (M1) can be represented as follows:

$$M1 = \begin{pmatrix} A_1 \\ A_2 \\ A_3 \\ A_4 \end{pmatrix} \quad (1)$$

For example, for a historical time interval $T_1$:
the count of data objects accessed by the user for a category $C_1=3$
the count of data objects accessed by the user for a category $C_2=4$
the count of data objects accessed by the user for a category $C_3=6$ Then, the first access element can be represented as $A_1=[3\ 4\ 6]$ Similarly, for historical time intervals $T_2$, $T_3$, and $T_4$, the access elements $A_2$, $A_3$, and $A_4$, respectively can be computed.

Thus, $A_2=[4\ 6\ 3]$; $A_3=[3\ 2\ 4]$; and $A_4=[3\ 7\ 2]$. Thus, each access element can be represented in a matrix with dimension n×1, where n is the number of categories. Accordingly, each access element can be represented as an access vector, where each category represents a dimension of the vector.

Then, the first matrix can be represented as $$M1 = \begin{pmatrix} 3 & 4 & 6 \\ 4 & 6 & 3 \\ 3 & 2 & 4 \\ 3 & 7 & 2 \end{pmatrix}$$

Here each row of the first matrix indicates an access element i.e. the count of data objects accessed by the user during a corresponding historical time interval for each of the plurality of semantic categories, whereas each column represents the count of data objects accessed by the user for each of the plurality of historical time intervals corresponding to a particular semantic category. Thus, the first matrix indicates the historical behavior of the user in the prior period.

In another example where the baseline access data are determined based on peer access data. In an example, if the plurality of access elements are $A_5$, $A_6$, $A_7$, and $A_8$ corresponding to peer users $U_1$, $U_2$, $U_3$, and $U_4$, respectively, and a plurality of semantic categories are $C_1$, $C_2$, and $C_3$, then the first matrix (M1) can be represented as follows:

$$M1 = \begin{pmatrix} A_5 \\ A_6 \\ A_7 \\ A_8 \end{pmatrix} \quad (1)$$

For example, for a user $U_1$
the count of data objects accessed for a semantic category $C_1=3$
the count of data objects accessed for a semantic category $C_2=4$
the count of data objects accessed for a semantic category $C_3=6$ Then, the first access element can be represented as $A_1=[3\ 4\ 6]$. In this representation, each column corresponds to a semantic category.

Similarly, for other peer users $U_2$, $U_3$, and $U_4$, the access elements $A_2$, $A_3$, and $A_4$, respectively can be computed.

Thus, $A_2=[4\ 6\ 3]$; $A_3=[3\ 2\ 4]$; and $A_4=[3\ 7\ 2]$. Thus, each access element can be represented in a matrix with dimension n×1, where n is the number of categories. Accordingly, each access element can be represented as an access vector, where each category represents a dimension of the vector.

Then, the first matrix can be represented as $$M1 = \begin{pmatrix} 3 & 4 & 6 \\ 4 & 6 & 3 \\ 3 & 2 & 4 \\ 3 & 7 & 2 \end{pmatrix}$$

Here each row of the first matrix indicates an access element i.e. the count of data objects accessed by a peer user for each of the plurality of semantic categories, where a search column of the first matrix represents the count of data objects accessed for each of the plurality of peer users corresponding to a particular semantic category. Thus, the first matrix indicates the behavior of the peer users for a particular time interval.

By structuring the first matrix in this manner, the server system 118 can distinguish between various dimensions of the user's baseline access data, such as the frequency of access to specific types of data or trends over time/peer users. The first matrix (M1) essentially captures the user's past behavior or behaviors of the peer users in a structured format, enabling the identification of patterns and deviations from expected activity.

Once the first matrix (M1) is computed, the server system 118 may be configured to generate a representation corresponding to the target access data as a second matrix (M2). The second matrix is a row matrix or a column matrix. Either the rows or columns of the second matrix (M2) represent the count of data objects accessed by the user across the plurality of semantic categories during the target time interval, while the other (among rows and columns) represents the semantic categories themselves. For example, if a plurality of semantic categories are $C_1$, $C_2$, and $C_3$, then
for a target time interval:
the count of data objects accessed by the user for a category $C_1$=3
the count of data objects accessed by the user for a category $C_2$=7
the count of data objects accessed by the user for a category $C_3$=9
then the second matrix (M2) corresponding to the target time interval can be represented as follows:

$$M2 = (3\ 7\ 9)$$

The dimension of the second matrix can be n×1, where 'n' is the number of semantic categories. In this example, n is 3. In this case, each column corresponds to a particular semantic category. In an embodiment, the dimensions of the access element and the second matrix are the same.

Once the first and second matrices are computed, the anomaly identification module 220 may be configured to compute a third matrix based on the first matrix. This third matrix is computed using the information in the first matrix and provides aggregated metrics to facilitate anomaly detection. Either the rows or columns of the third matrix correspond to mean values derived from the first matrix. The mean value represents the average count of data objects accessed by the user within each semantic category over the plurality of historical time intervals.

For example, if the first matrix $$(M1) = \begin{pmatrix} 3 & 4 & 6 \\ 4 & 6 & 3 \\ 3 & 2 & 4 \\ 3 & 7 & 2 \end{pmatrix},$$

the third matrix (M3) can be computed as follows:
average count of data objects accessed by the user for a category $C_1$=3.25
average count of data objects accessed by the user for a category $C_2$=4.75
average count of data objects accessed by the user for a category $C_3$=3.75
The third matrix can be represented as $$M3 = \begin{pmatrix} 3.25 \\ 4.75 \\ 3.75 \end{pmatrix}$$

The third matrix (M3) is a vector of mean values, whereas the third matrix is either a row matrix or a column matrix. In a first embodiment, each value in the third matrix corresponds to the average count of data objects accessed in a specific semantic category across the historical time intervals.

In a second embodiment, each value in the third matrix corresponds to the average count of data objects accessed in a specific semantic category across the plurality of peer users.

In an embodiment, the anomaly identification module 220 may calculate a deviation parameter for each of the plurality of semantic categories based on the determined baseline access data and target access data. In an embodiment, the deviation parameter indicates a deviation, for the corresponding semantic category, between a mean value of the data objects accessed by the user in the past and the count of the data objects accessed by the user during the target time interval. This allows the system to evaluate whether the user's current activity significantly deviates from their established historical behavior.

In another embodiment, the deviation parameter indicates a deviation between the mean value of the data objects accessed by the plurality of peer users and the count of the data objects accessed by the user for the corresponding semantic category during the target time interval. This enables the anomaly identification module 220 to determine whether the user's behavior diverges from the typical behavior of their peers in similar roles or groups.

In an embodiment, the anomaly identification module 220 may generate a deviation matrix (D) by representing the deviation parameter for each of the plurality of semantic categories. The deviation matrix can be computed by applying a matrix subtraction operation between the second matrix (M2) and the third matrix (M3). Thus, the deviation matrix (D) can be computed as $$D=(M2-M3) \qquad (2)$$

In an embodiment, the anomaly identification module 220 may compute the anomalous factor based, at least in part, on the calculated deviation parameter for each of the plurality of semantic categories and the first matrix.

To compute the anomalous factor comprehensively, the anomaly identification module 220 incorporates data from three matrices: the first matrix (M1), the second matrix (M2), and the third matrix (M3). The first matrix (M1) represents the baseline behavior, either as historical access data or peer access data, depending on the embodiment. The second matrix (M2) captures the target access data, representing the user's access patterns during the specific evaluation period (e.g., the current time interval). The third matrix (M3) summarizes aggregated metrics, such as mean values of the user's access counts across historical time intervals or peer users, providing a condensed view of expected behavior. These matrices collectively provide a comprehensive dataset for comparing historical, peer, and current access behaviors.

In an embodiment, once the first, second, the third matrices are computed, the anomaly identification module 220 may compute the anomalous factor based, at least in part, on the first, second, and third matrices.

An additional critical component in this calculation is the inverse covariance matrix (Q), which normalizes the contributions of different semantic categories and accounts for correlations among them. The covariance matrix, derived from the first matrix (M1), captures the relationships between variables (e.g., the access counts for various semantic categories). The inverse of the covariance matrix adjusts for these correlations and ensures that the anomalous factor reflects the relative significance of deviations across categories.

If the first matrix is M1, the second matrix is M2, the third matrix is M3, and the inverse covariance matrix is Q, then the anomalous factor can be computed as $$\text{Anomalous factor } (A_F) = \sqrt{(M2-M3)^T Q (M2-M3)} \quad (3)$$

Where T denotes the transpose operation of the matrix. Q represents an inverse covariance matrix of the first matrix, which can be computed based on calculating a correlation between the access elements of the first matrix. The computation of the correlation between two parameters is well-known to a person skilled in the art.

The above relation as indicated in equation (3) reflects the weighted deviations between observed and expected behaviors across semantic categories, thus generating a single value that quantifies the degree of anomaly in the user's access patterns.

The inverse covariance matrix is derived from the covariance matrix, which captures the relationships (variances and covariances) between multiple variables in a dataset. The inverse covariance matrix (Q) is the mathematical inverse of the covariance matrix. It is used to normalize the variance and account for correlations between variables, enabling accurate detection of anomalies in user behavior by highlighting deviations that account for both scale and correlation in the data.

The inverse covariance matrix ensures that the calculation considers both the variances of individual variables and the correlations between them. For example, if two semantic categories are strongly correlated, the inverse covariance matrix adjusts the contribution of their joint deviation, preventing overestimation of their impact on the anomaly score.

The inverse covariance matrix allows the detection of anomalies in high-dimensional data. Incorporating correlations between variables allows for more accurate and context-aware anomaly detection compared to univariate methods. These variables can include one or more of:

Semantic categories (columns of the first matrix).
Access element (rows of the first matrix).

In an embodiment, the anomaly identification module 220 may compute the anomalous factor based, at least in part, on the calculated deviation parameter for each of the plurality of semantic categories, and the first matrix. The deviation parameter for each of the plurality of semantic categories are combinely represented as a deviation matrix. If the deviation matrix is D, then the anomalous factor can be computed as $$\text{Anomalous factor } (A_F) = D^T Q D \quad (4)$$

Once the anomalous factor is computed, the anomaly identification module 220 may determine whether the user is an anomalous user based, at least in part, on the computed anomalous factor for the user. Thus, the anomaly identification module 220 evaluates whether the user's behavior can be classified as anomalous. This decision is based, at least in part, on comparing the computed anomalous factor against a predetermined threshold value. In particular, the anomaly identification module 220 may check whether the anomalous factor for the user exceeds a predetermined threshold value. When the anomalous factor associated with the user exceeds the predetermined threshold value, the anomaly identification module 220 may determine that the user is the anomalous user.

The anomalous factor quantifies the degree of deviation in the user's access behavior compared to the baseline access data, and the threshold acts as a decision boundary to differentiate between normal and potentially suspicious behavior. The anomaly identification module 220 may set a threshold value to balance sensitivity and specificity in anomaly detection. If the anomalous factor exceeds this value, it indicates that the user's behavior deviates significantly from their historical patterns or from the behavior of their peers. For instance, if a user typically accesses 10-15 documents in a category per week but suddenly accesses 50 documents, the anomalous factor would increase substantially. If this factor surpasses the threshold, the anomaly identification module 220 flags the user as anomalous and triggers appropriate responses, such as generating alerts for further investigation.

The determination process ensures that minor deviations in behavior, which may occur due to legitimate reasons such as temporary role changes or one-off tasks, do not result in false positives. The threshold value may also be dynamically adjusted based on contextual factors such as the user's role, access permissions, and the criticality of the data being accessed. For example, a lower threshold might be applied to users accessing highly sensitive documents, while a higher threshold might apply to less critical resources.

When the anomalous factor exceeds the threshold and the user is flagged as anomalous, the anomaly identification module 220 can trigger a customized action upon the determination of the anomalous user. The customized action includes transmitting an alert signal to a third-party system or blocking access permission associated with the user for a plurality of data objects.

Upon identification of the anomalous users, the anomaly identification module 220 can automatically trigger an alert signal to be transmitted to another computing device controlled by an administrator, providing details about the anomalous behavior for further investigation. The alert signal may include information about the user's access pattern, flagged permissions, and any data objects accessed.

In another embodiment, the anomaly identification module 220 can automatically trigger a review process for the identified anomalous users, which can involve a systematic assessment of the user's access level to ensure permissions align with their role and responsibilities.

In another embodiment, the anomaly identification module 220 can conduct a thorough review or continuous monitoring of all activities associated with the anomalous users, focusing on actions such as data access, document retrieval, and file interactions. For each user, the anomaly identification module 220 can log details about which specific documents or data objects were accessed, along with timestamps, access frequency, and any actions taken (e.g., view, edit, download). This enables the anomaly identification module 220 to build a comprehensive profile of typical access patterns for anomalous users, which can help in distinguishing legitimate activity from potential security threats and identifying anomalous access events in real-time.

In addition, the system 200 may use the anomalous factor to generate detailed reports, providing context about the deviation. This can include information about which data objects were accessed, the types of actions performed (e.g., viewing, editing, downloading), and the specific times of access. Such detailed insights allow security teams to investigate further and take appropriate measures to mitigate any risks, ensuring the integrity and security of enterprise systems. The use of an anomalous factor based on both baseline and target data provides a dynamic and responsive way to track and manage user behavior over time.

In another embodiment, upon identification of the anomalous users, the anomaly identification module 220 can temporarily revoke, restrict, or block the access for the anomalous users to sensitive data objects until a thorough review of the access permission data of the anomalous users is completed. Restricting access can include downgrading access to read-only or limiting access to specific categories of data.

Identifying anomalous users using anomalous factor offers several advantages, particularly for security, compliance, and efficient access management. The identification of anomalous behavior addresses practical security risks, directly integrating an access control improvement into the system to prevent unauthorized access. This integration of improved security measures reduces the likelihood of breaches, achieving an operational improvement in system security. For example, based on the detected anomalous users, the system can restrict the grouping of the users within the organization. In particular, the system can restructure the grouping of the users within the enterprises. The restructuring the grouping of the users can also remove unnecessary groups to better align with actual usage patterns. This limits the organization's exposure to potential security breaches and insider threats. Moreover, by optimizing the group structure, organizations can maintain tighter control over sensitive data, ensuring that only authorized users or teams have access to particular information, files, or systems.

Furthermore, by adjusting permissions based on user behavior analysis, this method optimizes access management workflows. The resulting efficiency in handling user permissions improves the operational functioning of access management systems by directly reducing administrative burden and minimizing errors, resulting in a concrete, beneficial outcome.

The identification of anomalous behaviour associated with access management decreases the risk of insider threats by aligning permissions more closely with job roles and preventing access misuse or exploitation. This provides a security-based improvement to the access system, contributing to the overall integrity and safety of sensitive data.

In an embodiment, the display management module 222 is configured to display the set of data objects accessed by the anomalous user. Further, the display management module 222 is also configured to display a message including user information associated with the anomalous users as well as the details about the accessed data objects.

Although FIG. 2 shows the hardware elements of the server system 200, it is to be understood that other embodiments are not limited thereon. In other embodiments, the server system 200 may include fewer or more number of elements. Further, the labels or names of the elements are used only for illustrative purposes and do not limit the scope of the invention. One or more components can be combined to perform the same or substantially similar function.

Figure 3A:
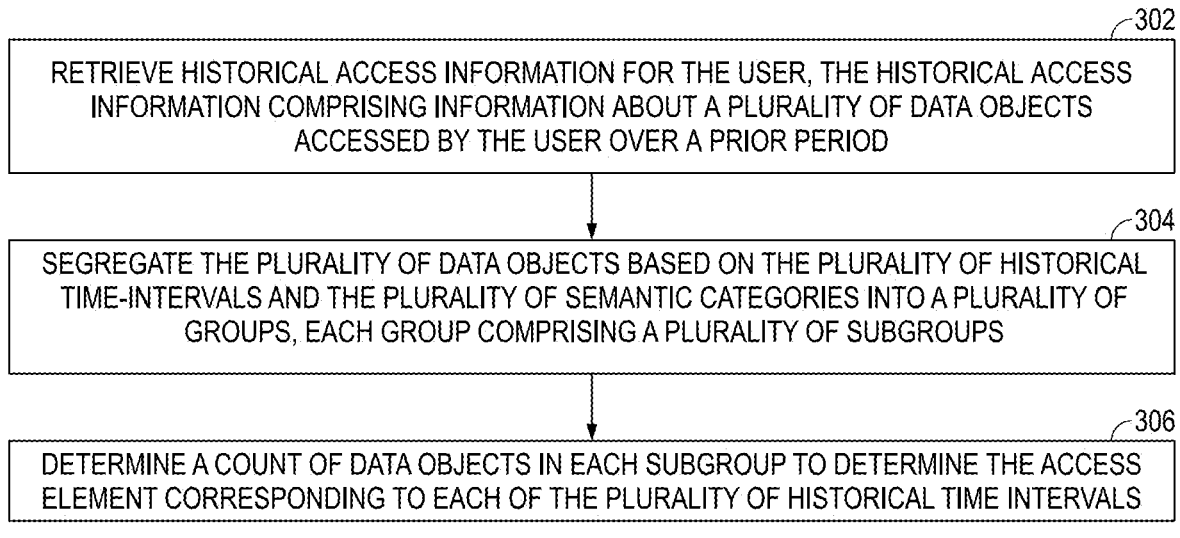
FIG. 3A illustrates a flow chart illustrating a method for determining baseline access data for identification of the anomalous users, in accordance with an embodiment of the present disclosure.

FIG. 3 illustrates a flow chart illustrating a method 300 for determining baseline access data for identification of the anomalous users, in accordance with an embodiment of the present disclosure. The method 300 depicted in the flow diagram may be executed by, for example, the at least one server system such as the server system 118. Operations of the method 300, and combinations of the operations in the method 300, may be implemented by, for example, hardware, firmware, a processor, circuitry, and/or a different device associated with the execution of software that includes one or more computer program instructions. The sequence of operations of the method 300 may not be necessarily executed in the same order as they are presented. Further, one or more operations may be grouped and performed in the form of a single step, or one operation may have several sub-steps that may be performed in parallel or a sequential manner.

The method 300 for determining baseline access data establishes a reference point for normal user behavior, allowing the system to detect deviations for the identification of anomalous users. The method 300 starts with step 302.

At step 302, the server system 118 may retrieve historical access information associated with the user. The historical access information may include information about a plurality of data objects accessed by the user over a defined prior period. The historical access information may also include a time stamp for each data object accessed. The historical access information may include information about the semantic category associated with each of the plurality of data objects.

At step 304, the server system 118 may segregate the plurality of data objects based on the plurality of historical time intervals and the plurality of semantic categories into a plurality of groups, where each group corresponds to a respective historical time interval. Each group has a plurality of subgroups and each subgroup corresponds to a semantic category among the plurality of semantic categories. Therefore, each group can include data objects accessed by the user during a respective historical time interval, whereas each subgroup within the group can include data objects accessed by the user during a respective historical time interval corresponding to a particular semantic category. Thus, the number of groups corresponds to a number of historical time intervals and the number of subgroups corresponds to a number of plurality of semantic categories.

In other words, the server system 118 is configured to cluster the data objects associated with the historical access information into a plurality of groups based on historical time intervals i.e. distinct time intervals. The prior period can include or can be divided into a plurality of historical intervals. For example, the system 118 may segregate historical access information into daily, weekly, or monthly intervals. Within each interval, the system 118 identifies the specific data objects accessed by the user. Based on the time-stamping, the data objects corresponding to each time interval can be determined.

After determining the data objects accessed within each time interval, the server system 118 further segregates the historical access information by semantic categories i.e. generating a plurality of subgroups corresponding to the plurality of semantic categories, where each subgroup corresponds to a semantic category. This dual-layered segmentation e.g. time and category enables more detailed insights into what types of resources the user accessed and when.

The plurality of historical intervals are either pre-defined or determined based on the division of duration of the prior period into a plurality of fixed intervals. Thus, the server system 118 may first segregate the historical access data based on the plurality of historical time intervals and then further segregate the segregated data based on the plurality of semantic categories. Thus, the group represents the data objects corresponding to a particular time interval, whereas the subgroup with the group corresponds to data objects that belong to a semantic category for the particular time interval.

At step 306, the server system may determine a count of data objects in each subgroup to generate the access element corresponding to each historical time interval. The access element indicates a number of data objects for each of the plurality of semantic categories for the respective time interval. An access element represents a summarized view of the user's activity during a specific time interval. Each access element corresponds to a respective historical time interval from a plurality of historical time intervals. Each access element indicates a count of data objects accessed by the user within each of a plurality of semantic categories during a respective historical time interval. Thus, the system 118 is configured to determine baseline access data including the plurality of access elements.

Figure 3B:
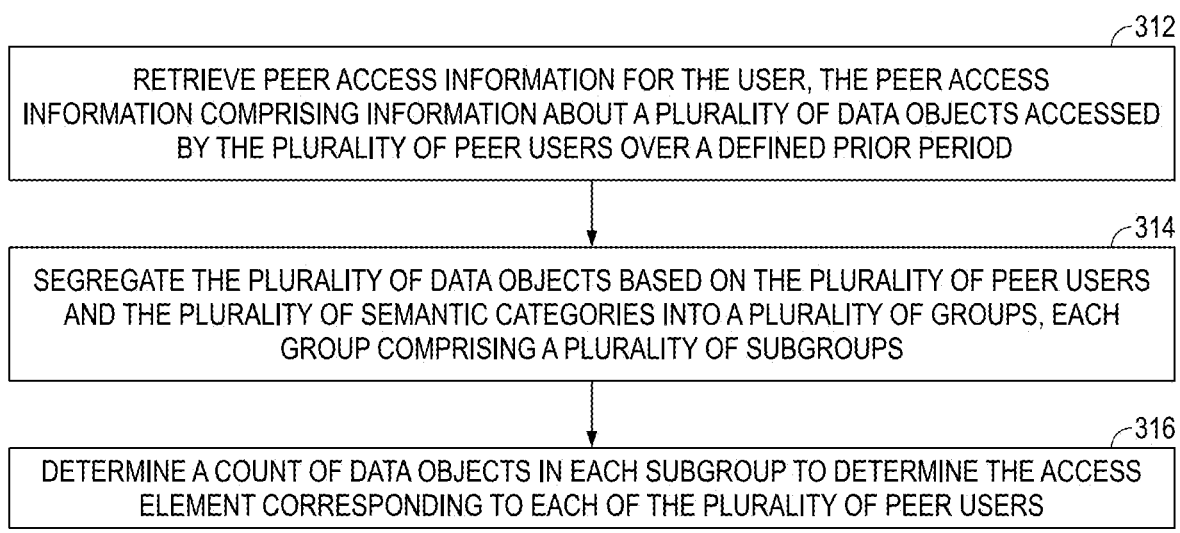
FIG. 3B illustrates a flow chart illustrating a method for determining baseline access data for identification of the anomalous users, in accordance with an alternate embodiment of the present disclosure.

FIG. 3B illustrates a flow chart illustrating a method 311 for determining baseline access data, in accordance with another embodiment of the present disclosure. The method 300 depicted in the flow diagram may be executed by, for example, the at least one server system such as the server system 118. Operations of the method 311, and combinations of the operations in the method 300, may be implemented by, for example, hardware, firmware, a processor, circuitry, and/or a different device associated with the execution of software that includes one or more computer program instructions. The sequence of operations of the method 300 may not be necessarily executed in the same order as they are presented. Further, one or more operations may be grouped and performed in the form of a single step, or one operation may have several sub-steps that may be performed in parallel or a sequential manner.

The method 311 describes a method for determining baseline access data establishes a reference point for normal user behavior, allowing the system to detect deviations for identification of the anomalous users. The method 311 starts with step 312.

At step 312, the server system 118 may retrieve peer access information for the user. The peer access information may include information about data objects accessed by each of the plurality of peer users over a defined prior period. The peer access information may include information about the semantic category associated with each of the plurality of data objects.

At step 314, the server system 118 may segregate the plurality of data objects based on a plurality of peer users and a plurality of semantic categories into a plurality of groups. Each group has a plurality of subgroups. The server system 118 may first segregate the peer access data based on the plurality of peer users and then further segregate the segregated data based on the plurality of semantic categories. Thus, as a result of this step, a plurality of groups are formed, where each group has a plurality of subgroups. Each group can include the data objects accessed by a particular peer user, whereas each subgroup within the group corresponds to data objects that belong to a semantic category and are accessed by the same user.

In other words, the server system 118 is configured to cluster the data objects associated with the peer access information into a plurality of groups based on peer users i.e. distinct peer users. After determining the data objects accessed within each peer user, the server system 118 further segregates the peer access information by semantic categories i.e. generating a plurality of subgroups corresponding to the plurality of semantic categories, where each subgroup corresponds to a semantic category.

At step 316, the server system 118 may determine a count of data objects in each subgroup to determine the access element corresponding to each peer user. The access element indicates a number of data objects accessed by the respective peer user for each of the plurality of semantic categories. An access element represents a summarized view of a peer user's activity. Each access element corresponds to a respective peer user among a plurality of peer users. Each access element indicates a count of data objects accessed by a corresponding peer user within each of a plurality of semantic categories. In an embodiment, all the access elements correspond to the same time interval. Alternatively, all the access elements may have different time frames. Thus, the system 118 is configured to determine baseline access data that can include a plurality of access elements.

Figure 4:
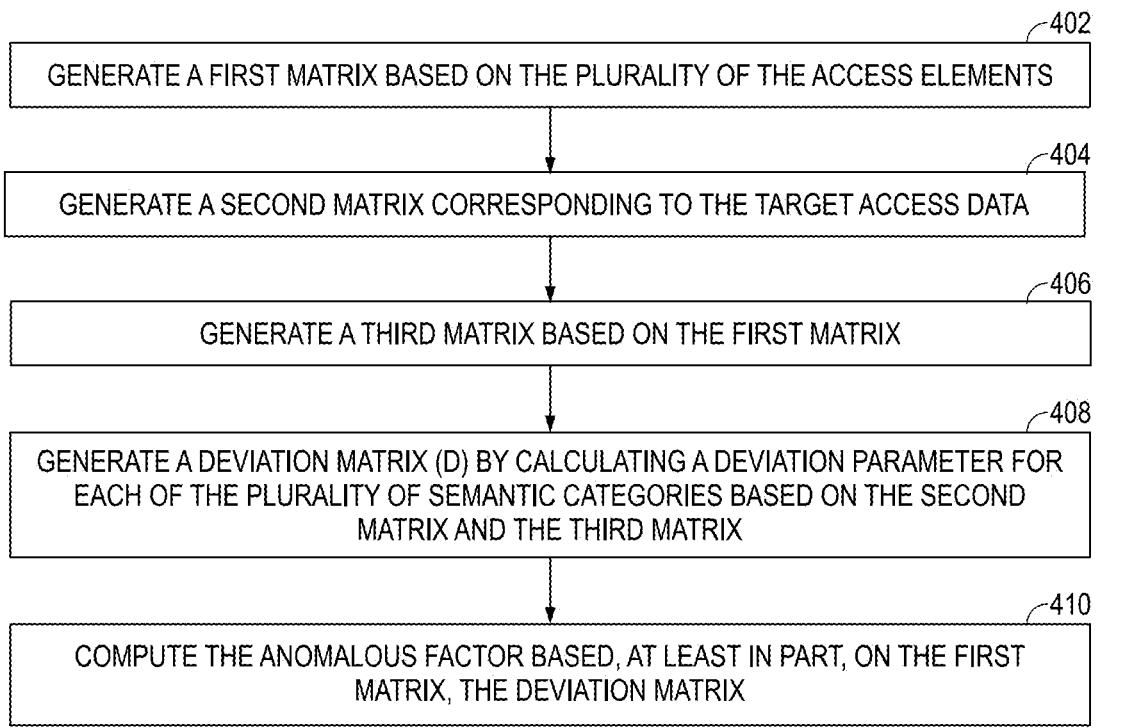
FIG. 4 is a flow diagram of a method for computing an anomalous factor based on the baseline access data and the target access data, in accordance with an embodiment of the present disclosure.

FIG. 4 is a flow diagram of a method 400 for computing an anomalous factor based on baseline access data and target access data, in accordance with an embodiment of the present disclosure. The method 400 depicted in the flow diagram may be executed by, for example, the at least one server system such as the server system 118. Operations of the flow diagram of the method 400, and combinations of operations in the flow diagram of the method 400, may be implemented by, for example, hardware, firmware, a processor, circuitry, and/or a different device associated with the execution of software that includes one or more computer program instructions. The method 400 starts at operation 402.

At step 402, the system 118 may generate a first matrix (M1) based on the plurality of the access elements. The first matrix (M1) indicates historical behavior of the user or access behavior of the peer user. Each row or column of the first matrix (M1) represents a respective access element among the plurality of access elements.

At step 404, the system 118 may generate a second matrix (M2) corresponding to the target access data. One of the rows and columns of the second matrix (M2) represent the count of the data objects accessed by the user across the plurality of semantic categories during the target time interval.

At step 406, the system 118 may generate a third matrix (M3) based on the first matrix. In an embodiment, one of the rows and columns of the third matrix (M3) correspond to a mean value of the count of the data objects accessed by the user across the plurality of historical time intervals for each of the plurality of semantic categories.

In another embodiment, one of rows and columns of the third matrix represent a mean value of the count of the data objects accessed by the plurality of peer users for each of the plurality of semantic categories.

At step 408, the system 118 may generate a deviation matrix (D) by calculating a deviation parameter for each of the plurality of semantic categories based on the second matrix and the third matrix. In an embodiment, the deviation parameter indicates a deviation between a mean value of the count of the data objects accessed by the user in the past and the count of the data objects accessed by the user during the target time interval for the corresponding semantic category.

In another embodiment, the deviation parameter indicates a deviation between the mean value of the count of the data objects accessed by the plurality of peer users and the count of the data objects accessed by the user during the target time interval for the corresponding semantic category.

At step 410, the system 118 may compute the anomalous factor ($A_F$) based, at least in part, on the first matrix (M1), and the deviation matrix (D). The deviation matrix (D) is derived from the second matrix (M2) and the third matrix (M3). Thus, the anomalous factor ($A_F$) can be computed as $$\text{Anomalous factor } (A_F) = \sqrt{D^T Q D} \quad (4)$$

Q is inverse covariance matrix of the first matrix (M1).

In another embodiment, the system 118 may compute the anomalous factor based, at least in part, on the first (M1), second (M2), and third (M3) matrices. Thus, the anomalous factor ($A_F$) can be computed as $$\text{Anomalous factor } (A_F) = \sqrt{(M2-M3)^T Q (M2-M3)} \quad (3)$$

The anomalous factor is a quantitative measure used to determine the extent to which a user's behavior deviates from established norms, such as their historical behavior or the behavior of their peers. It plays a central role in anomaly detection systems, providing a single metric to assess whether the user's activity is unusual or suspicious. This factor is calculated by comparing the user's current access patterns (captured in the target access data) against the baseline access data, which can include historical data or peer behavior patterns. The anomalous factor aggregates these comparisons across multiple semantic categories to provide a comprehensive evaluation of the user's behavior.

The anomalous factor ($A_F$), which quantifies how far a data point (e.g., the target access data) lies from the center of a distribution (e.g., the baseline access data). This factor helps in identifying various forms of anomalies, including unauthorized access attempts, abnormal patterns of data access, or even unusual access times. For instance, if a user normally accesses files during business hours but suddenly accesses highly sensitive documents at night, the anomalous factor would increase, signaling that the behavior is out of the ordinary. Similarly, if a user accesses a broader range of documents than usual, this may trigger an elevated anomalous factor.

Figure 5:
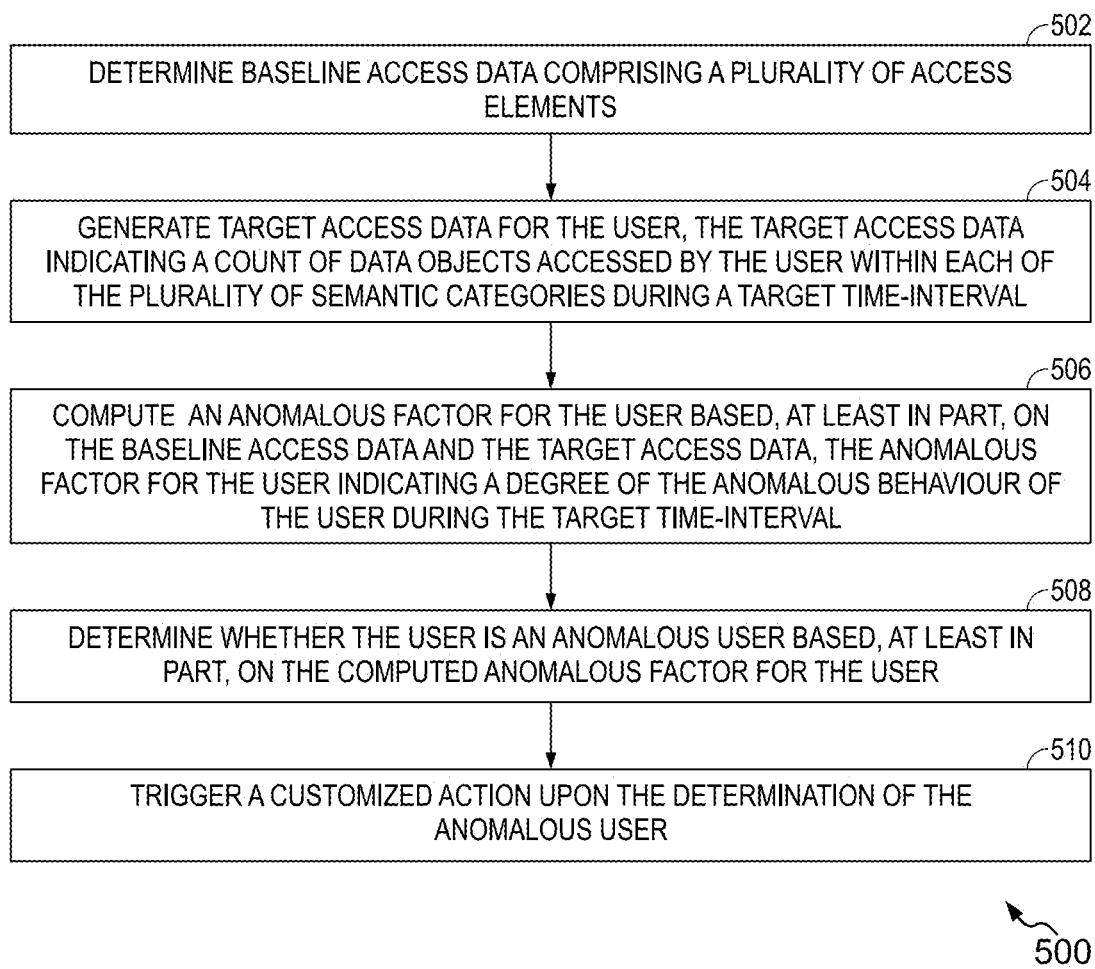
FIG. 5 is a flow diagram of a computer-implemented method for determining an anomalous behavior of a user, in accordance with an embodiment of the present disclosure.

FIG. 5 is a flow diagram of a computer-implemented method 500 for identifying anomalous behavior of users, in accordance with an embodiment of the present disclosure. The method 500 depicted in the flow diagram may be executed by, for example, the at least one server system such as the server system 118. Operations of the flow diagram of the method 500, and combinations of operations in the flow diagram of the method 500, may be implemented by, for example, hardware, firmware, a processor, circuitry, and/or a different device associated with the execution of software that includes one or more computer program instructions. The method 500 starts at operation 502.

At step 502, the method 500 includes determining baseline access data including a plurality of access elements. In an embodiment, each access element corresponds to a respective historical time interval from a plurality of historical time intervals. Each access element indicates a count of data objects accessed by the user within each of a plurality of semantic categories during a respective historical time interval.

In another embodiment, each access element corresponds to a respective peer user from a plurality of peer users. Each access element indicates a count of data objects accessed by the respective peer user within each of a plurality of semantic categories.

At step 504, the method 500 includes generating target access data for the user. The target access data indicates a count of data objects accessed by the user within each of the plurality of semantic categories during a target time interval. This step focuses on capturing a detailed snapshot of the user's activities during a specific target time interval (e.g., a day, week, or month). The data is structured to reflect the count of data objects accessed by the user across various predefined semantic categories. The target access serves as a critical input for analyzing and detecting anomalies in user behavior.

At step 506, the method 500 includes computing an anomalous factor for the user based, at least in part, on the baseline access data and the target access data. The anomalous factor for the user indicates a degree of the anomalous behavior of the user during the target time interval. This step includes comparing the user's current behavior corresponding to target access data against the baseline access data (historical or peer behavior) using statistical or mathematical techniques. By structuring the baseline access data and the target access data, the system can identify deviations in both the volume and type of data accessed.

The anomalous factor provides a single, aggregated measure of the degree of anomalous behavior exhibited by the user during the target time interval. A higher anomalous factor indicates significant deviations, such as accessing more files than usual in a specific category, interacting with unfamiliar types of data, or accessing data at unusual times. This metric enables precise and efficient anomaly detection, allowing enterprises to identify and address potential risks, such as unauthorized access or insider threats, in real-time.

At step 508, the method 500 includes determining whether the user is an anomalous user based, at least in part, on the computed anomalous factor for the user. In an embodiment, determining whether the user is the anomalous user includes checking whether the anomalous factor for the user exceeds a predetermined threshold value and determining that the user is the anomalous user when the anomalous factor associated with the user exceeds the predetermined threshold value.

At step 510, the method includes triggering a customized action upon the determination of the anomalous user. The customized action includes transmitting an alert signal to a third-party system or blocking access permission associated with the user for a plurality of data objects.

Figure 6:
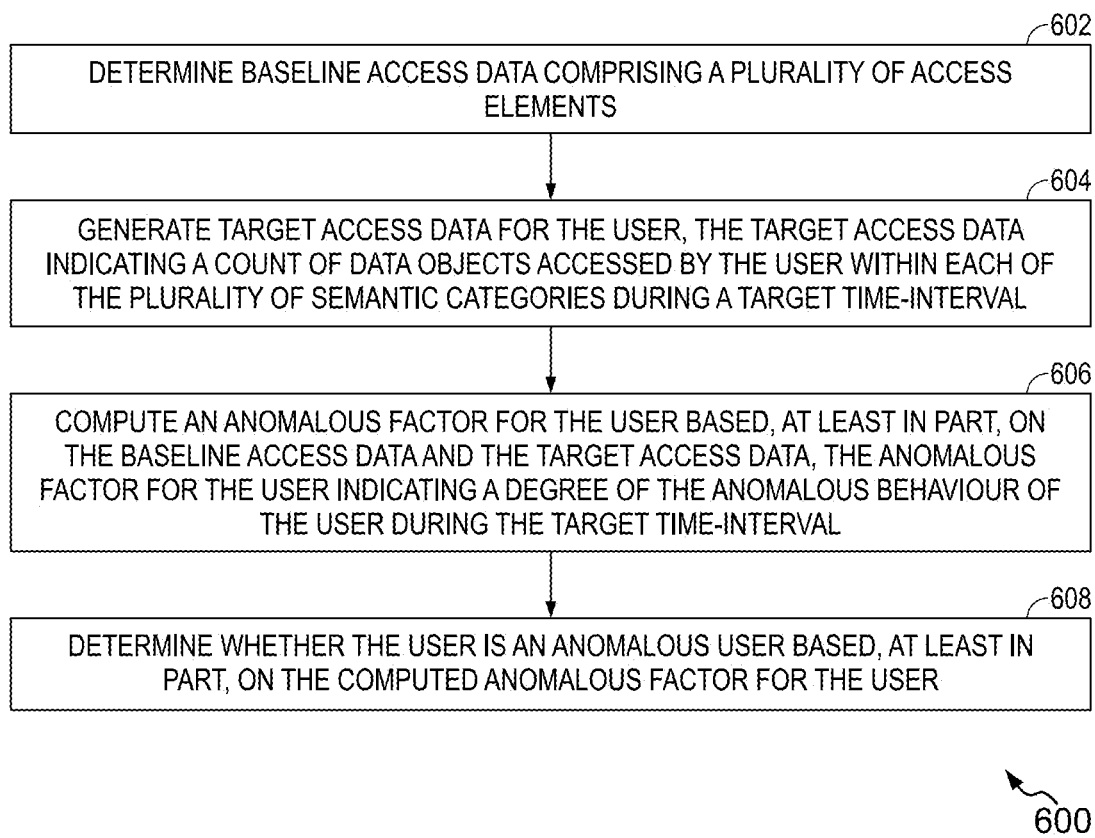
FIG. 6 is a flow diagram of a computer-implemented method for determining an anomalous behavior of a user, in accordance with another embodiment of the present disclosure.

FIG. 6 is a flow diagram of a computer-implemented method 600 for identifying anomalous behavior of users, in accordance with another embodiment of the present disclosure. The method 600 depicted in the flow diagram may be executed by, for example, the at least one server system such as the server system 118. Operations of the flow diagram of the method 600, and combinations of operations in the flow diagram of the method 600, may be implemented by, for example, hardware, firmware, a processor, circuitry, and/or a different device associated with the execution of software that includes one or more computer program instructions. The method 600 starts at operation 602.

At step 602, the method 600 includes determining baseline access data including a plurality of access elements. In an embodiment, each access element corresponds to a respective historical time interval from a plurality of historical time intervals. Each access element indicates a count of data objects accessed by the user within each of a plurality of semantic categories during a respective historical time interval.

In another embodiment, each access element corresponds to a respective peer user from a plurality of peer users. Each access element indicates a count of data objects accessed by the respective peer user within each of a plurality of semantic categories.

At step 604, the method 600 includes generating target access data for the user. The target access data indicates a count of data objects accessed by the user within each of the plurality of semantic categories during a target time interval.

At step 606, the method 600 includes computing an anomalous factor for the user based, at least in part, on the baseline access data and the target access data. The anomalous factor for the user indicates a degree of the anomalous behavior of the user during the target time interval.

At step 608, the method 600 includes determining whether the user is an anomalous user based, at least in part, on the computed anomalous factor for the user. In an embodiment, determining whether the user is the anomalous user includes checking whether the anomalous factor for the user exceeds a predetermined threshold value and determining that the user is the anomalous user when the anomalous factor associated with the user exceeds the predetermined threshold value.

Figure 7:
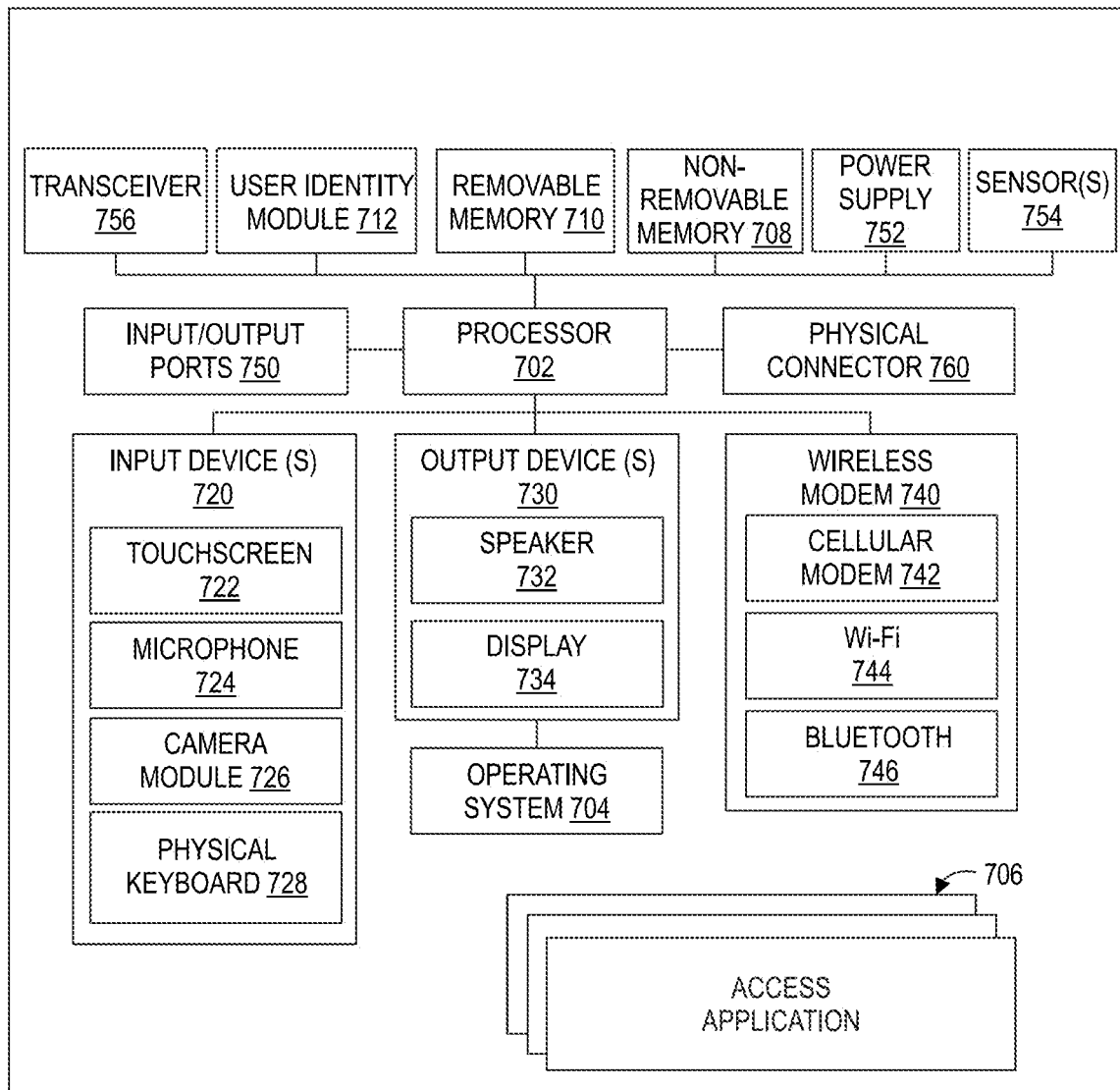
FIG. 7 is a simplified block diagram of a user device, in accordance with various embodiments of the present disclosure.

FIG. 7 is a simplified block diagram of a user device 700 for example, a mobile phone or a desktop computer capable of implementing the various embodiments of the present disclosure. For example, the user device 700 may correspond to the user devices 102-108 of FIG. 1. The user device 700 is depicted to include one or more applications, such as an access application 706 facilitated by the server system 118. The access application 706 can be an instance of an application downloaded from the server system 118 or a third-party server. The access application 706 is capable of communicating with the server system 118 for identifying anomalous users shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional, and thus in an example embodiment may include more, less, or different components than those described in connection with the example embodiment of FIG. 7. As such, among other examples, the user device 700 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control, and processing logic circuitry) for performing such tasks as signal coding, data processing, image processing, input/output processing, power control, and/or other functions. An operating system 704 controls the allocation and usage of the components of the user device 700 and supports one or more application programs, such as the access application 706, that implements one or more of the innovative features described herein. In addition to the access application 706, the applications may include common mobile computing applications (e.g., telephony applications, email applications, calendars, contact managers, web browsers, and messaging applications) or any other computing application.

The illustrated user device 700 includes one or more memory components, for example, a non-removable memory 708 and/or a removable memory 710. The non-removable memory 708 and the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the access application 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global Systems for Mobile (GSM) communication systems, Code Division Multiple Access (CDMA) systems, or third-generation (3G) wireless communication protocols such as Universal Mobile Telecommunications System (UMTS), CDMA9000, wide-band CDMA (WCDMA) and time division-synchronous CDMA (TD-SCDMA), or with fourth-generation (4G) wireless communication protocols such as LTE (Long-Term Evolution).

The user device 700 can support one or more input devices 720 (hereinafter referred to as "input devices") and one or more output devices 730 (hereinafter referred to as "output devices"). Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device, or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 (e.g., an accelerometer, a gyroscope, a compass, or an infrared proximity sensor) for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

The disclosed methods 300, 311, 400, 500, and 600, or one or more operations of these methods may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 118 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for determining an anomalous behavior of a user, the method comprising:
    determining, by a server system, baseline access data comprising a plurality of access elements, each access element corresponding to a respective historical time interval from a plurality of historical time intervals, each access element indicating a count of data objects accessed by the user within each of a plurality of semantic categories during a respective historical time interval;
    generating, by the server system, target access data for the user, the target access data indicating a count of data objects accessed by the user within each of the plurality of semantic categories during a target time interval;
    computing, by the server system, an anomalous factor for the user based, at least in part, on the baseline access data and the target access data, the anomalous factor for the user indicating a degree of the anomalous behavior of the user during the target time interval;
    determining, by the server system, whether the user is an anomalous user based, at least in part, on the computed anomalous factor for the user; and
    triggering, by the server system, a customized action upon the determination of the anomalous user, wherein the customized action comprises transmitting an alert signal to a third-party system or blocking access permission associated with the user for a set of data objects.

2. The method as claimed in claim 1, wherein determining whether the user is the anomalous user comprises:
    checking whether the anomalous factor for the user exceeds a predetermined threshold value; and
    determining that the user is the anomalous user when the anomalous factor associated with the user exceeds the predetermined threshold value.

3. The method as claimed in claim 1, wherein determining the baseline access data for the user comprises:
    retrieving historical access information for the user, the historical access information comprising a plurality of data objects accessed by the user over a prior period, the plurality of data objects being associated with a plurality of semantic categories;
    segregating the plurality of data objects based on the plurality of historical time intervals and the plurality of semantic categories into a plurality of groups, each group has a plurality of subgroups and each subgroup corresponds to a semantic category among the plurality of semantic categories; and
    determining a count of data objects in each subgroup to generate the access element corresponding to each of the plurality of historical time intervals.

4. The method as claimed in claim 1, wherein computing the anomalous factor comprises:
    generating a first matrix based on the plurality of the access elements, the first matrix indicating a historical behavior of the user, wherein each row or column of the first matrix represents a respective access element among the plurality of access elements;

generating a second matrix corresponding to the target access data, wherein one of rows and columns of the second matrix represent the count of the data objects accessed by the user across the plurality of semantic categories during the target time interval;

generating a third matrix based on the first matrix, wherein one of rows and columns of the third matrix represent a mean value of the count of the data objects accessed by the user for each of the plurality of semantic categories across the plurality of historical time intervals; and computing the anomalous factor based, at least in part, on the first matrix, the second matrix, and the third matrix.

5. The method as claimed in claim 4, wherein computing the anomalous factor comprises:

calculating a deviation parameter for each of the plurality of semantic categories based on the second matrix and the third matrix, the deviation parameter indicating a deviation between the mean value of the count of the data objects accessed by the user in the past and the count of the data objects accessed by the user during the target time interval for the corresponding semantic category; and computing the anomalous factor based, at least in part, on the calculated deviation parameter for each of the plurality of semantic categories, and the first matrix.

6. A method for determining an anomalous behavior of a user, the method comprising:

determining, by a server system, baseline access data comprising a plurality of access elements, each access element corresponding to a respective peer user from a plurality of peer users, each access element indicating a count of data objects accessed by the respective peer user within each of a plurality of semantic categories;

generating, by the server system, target access data for the user, the target access data indicating a count of data objects accessed by the user within each of the plurality of semantic categories during a target time interval;

computing, by the server system, an anomalous factor for the user based, at least in part, on the baseline access data and the target access data, the anomalous factor for the user indicating a degree of the anomalous behavior of the user during the target time interval;

determining, by the server system, whether the user is an anomalous user based, at least in part, on the computed anomalous factor for the user; and triggering, by the server system, a customized action upon the determination of the anomalous user, wherein the customized action comprises transmitting an alert signal to a third-party system or blocking access permission associated with the user for a set of data objects.

7. The method as claimed in claim 6, wherein computing the anomalous factor comprises:

generating a first matrix based on the plurality of the access elements, the first matrix indicating an access behavior of the plurality of peer users, wherein each row or column of the first matrix represents a respective access element among the plurality of access elements;

generating a second matrix corresponding to the target access data, wherein one of rows and columns of the second matrix represent the count of the data objects accessed by the user across the plurality of semantic categories during the target time interval;

generating a third matrix based on the first matrix, wherein one of rows and columns of the third matrix represent a mean value of the count of the data objects accessed by the plurality of peer users for each of the plurality of semantic categories; and computing the anomalous factor based, at least in part, on the first matrix, the second matrix, and the third matrix.

8. The method as claimed in claim 7, wherein computing the anomalous factor comprises:

calculating a deviation parameter for each of the plurality of semantic categories based on the second matrix and the third matrix, the deviation parameter indicating a deviation between the mean value of the count of the data objects accessed by the plurality of peer users and the count of the data objects accessed by the user during the target time interval for the corresponding semantic category; and computing the anomalous factor based, at least in part, on the calculated deviation parameter for each of the plurality of semantic categories, and the first matrix.

9. The method as claimed in claim 6, wherein determining the baseline access data for the user comprises:

retrieving peer access information for the user, the peer access information comprising information about a plurality of data objects accessed by a plurality of peer users over a prior period, the plurality of data objects being associated with a plurality of semantic categories;

segregating the plurality of data objects based on the plurality of peer users and the plurality of semantic categories into a plurality of groups, each group has a plurality of subgroups and each subgroup corresponds to a semantic category among the plurality of semantic categories; and determining a count of data objects in each subgroup to generate the access element corresponding to each of the plurality of peer users.

10. A server system, the system comprising:

a memory configured to store instructions;

a communication interface; and a processor in communication with the memory and the communication interface, the processor configured to execute the instructions stored in the memory and thereby cause the system to perform at least in part to:

determine baseline access data comprising a plurality of access elements, each access element corresponding to a respective historical time interval from a plurality of historical time intervals, each access element indicating a count of data objects accessed by the user within each of a plurality of semantic categories during a respective historical time interval;

generate target access data for the user, the target access data indicating a count of data objects accessed by the user within each of the plurality of semantic categories during a target time interval;

compute an anomalous factor for the user based, at least in part, on the baseline access data and the target access data, the anomalous factor for the user indicating a degree of the anomalous behavior of the user during the target time interval;

determine whether the user is an anomalous user based, at least in part, on the computed anomalous factor for the user; and trigger a customized action upon the determination of the anomalous user, wherein the customized action comprises transmitting an alert signal to a third-party system or blocking access permission associated with the user for a set of data objects.

11. The system as claimed in claim 10, wherein to determine whether the user is the anomalous user, the system is caused to:
  check whether the anomalous factor for the user exceeds a predetermined threshold value; and
  determine that the user is the anomalous user when the anomalous factor associated with the user exceeds the predetermined threshold value.

12. The system as claimed in claim 10, wherein to determine the baseline access data for the user, the system is caused to:
  retrieve historical access information associated with an interaction between the user and a plurality of data objects over a prior period comprising the plurality of historical time intervals, the plurality of data objects being associated with a plurality of semantic categories;
  segregate the plurality of data objects based on the plurality of historical time intervals and the plurality of semantic categories into a plurality of groups, each group has a plurality of subgroups; and
  generate the access element for each of the historical time intervals based on the segmented access information.

13. The system as claimed in claim 10, wherein to compute the anomalous factor, the system is caused to:
  generate a first matrix based on the plurality of the access elements, the first matrix indicating a historical behavior of the user, wherein each row or column of the first matrix represents a respective access element among the plurality of access elements;
  generate a second matrix corresponding to the target access data, wherein one of rows and columns of the second matrix represent the count of the data objects accessed by the user across the plurality of semantic categories during the target time interval;
  generate a third matrix based on the first matrix, wherein one of rows and columns of the third matrix represent a mean value of the count of the data objects accessed by the user for each of the plurality of semantic categories across the plurality of historical time intervals; and
  compute the anomalous factor based, at least in part, on the first matrix, the second matrix, and the third matrix.

14. The system as claimed in claim 13, wherein to compute the anomalous factor, the system is further caused to:
  calculate a deviation parameter for each of the plurality of semantic categories based on the second matrix and the third matrix, the deviation parameter indicating a deviation between the mean value of the count of the data objects accessed by the user in the past and the count of the data objects accessed by the user during the target time interval for the corresponding semantic category; and
  compute the anomalous factor based, at least in part, on the calculated deviation parameter for each of the plurality of semantic categories, and the first matrix.

15. A server system, the system comprising:
  a memory configured to store instructions;
  a communication interface; and
  a processor in communication with the memory and the communication interface, the processor configured to execute the instructions stored in the memory and thereby cause the system to perform at least in part to:
    determine baseline access data comprising a plurality of access elements, each access element corresponding to a respective peer user from a plurality of peer users, each access element indicating a count of data objects accessed by the respective peer user within each of a plurality of semantic categories;
    generate target access data for the user, the target access data indicating a count of data objects accessed by the user within each of the plurality of semantic categories during a target time interval;
    compute an anomalous factor for the user based, at least in part, on the baseline access data and the target access data, the anomalous factor for the user indicating a degree of the anomalous behavior of the user during the target time interval;
    determine whether the user is an anomalous user based, at least in part, on the computed anomalous factor for the user; and
    trigger a customized action upon the determination of the anomalous user, wherein the customized action comprises transmitting an alert signal to a third-party system or blocking access permission associated with the user for a set of data objects.

16. The system as claimed in claim 15, wherein to compute the anomalous factor, the system is caused to:
  generate a first matrix based on the plurality of the access elements, the first matrix indicating an access behavior of the plurality of peer users, wherein each row or column of the first matrix represents a respective access element among the plurality of access elements;
  generate a second matrix corresponding to the target access data, wherein one of rows and columns of the second matrix represent the count of the data objects accessed by the user across the plurality of semantic categories during the target time interval;
  generate a third matrix based on the first matrix, wherein one of rows and columns of the third matrix represent a mean value of the count of the data objects accessed by the plurality of peer users for each of the plurality of semantic categories; and
  compute the anomalous factor based, at least in part, on the first matrix, the second matrix, and the third matrix.

17. The system as claimed in claim 15, wherein to compute the anomalous factor, the system is caused to:
  calculate a deviation parameter for each of the plurality of semantic categories based on the second matrix and the third matrix, the deviation parameter indicating a deviation between the mean value of the count of the data objects accessed by the plurality of peer users and the count of the data objects accessed by the user during the target time interval for the corresponding semantic category; and
  compute the anomalous factor based, at least in part, on the calculated deviation parameter for each of the plurality of semantic categories, and the first matrix.

18. The system as claimed in claim 15, wherein to determine the baseline access data for the user, the system is caused to:
  retrieve peer access information for the user, the peer access information comprising information about a plurality of data objects accessed by a plurality of peer users over a prior period, the plurality of data objects being associated with a plurality of semantic categories;
  segregate the plurality of data objects based on the plurality of peer users and the plurality of semantic categories into a plurality of groups, each group has a plurality of subgroups and each subgroup corresponds to a semantic category among the plurality of semantic categories; and determine a count of data objects in each subgroup to generate the access element corresponding to each of the plurality of peer users.

* * * * *